(12) United States Patent
Huang et al.

(10) Patent No.: US 9,297,221 B2
(45) Date of Patent: Mar. 29, 2016

(54) CATENARY RISER TESTING

(71) Applicant: DMAR ENGINEERING, INC., Houston, TX (US)

(72) Inventors: Zhiming Huang, Missouri City, TX (US); Dagang Zhang, Houston, TX (US)

(73) Assignee: DMAR Engineering, Inc., Houston, TX (US)

( * ) Notice: Subject to any disclaimer, the term of this patent is extended or adjusted under 35 U.S.C. 154(b) by 57 days.

(21) Appl. No.: 14/294,150

(22) Filed: Jun. 3, 2014

(65) Prior Publication Data

US 2015/0240574 A1 Aug. 27, 2015

Related U.S. Application Data

(60) Provisional application No. 61/944,580, filed on Feb. 26, 2014.

(51) Int. Cl.
*G01N 3/02* (2006.01)
*E21B 19/00* (2006.01)
*G01D 11/30* (2006.01)
*E21B 17/01* (2006.01)
*G01M 5/00* (2006.01)

(52) U.S. Cl.
CPC ............ *E21B 19/004* (2013.01); *E21B 17/015* (2013.01); *G01D 11/30* (2013.01); *G01M 5/0058* (2013.01)

(58) Field of Classification Search
CPC ........ G01N 3/20; E21B 49/003; E21B 49/001; E21B 19/004; G01D 11/30
USPC ............................................................ 73/856
See application file for complete search history.

(56) References Cited

U.S. PATENT DOCUMENTS 5,738,173 A * 4/1998 Burge ................. B65H 75/22 166/385
6,295,857 B1 * 10/2001 Rupoli ................ B21D 11/12 72/294
6,434,995 B1 * 8/2002 Kataoka ............... B21D 7/024 72/149

* cited by examiner

*Primary Examiner* — Lisa Caputo
*Assistant Examiner* — Brandi N Hopkins
(74) *Attorney, Agent, or Firm* — Liaoteng Wang

(57) ABSTRACT

Apparatus and methods related to catenary riser testing are described. For example, some embodiments may contain a ground platform, elevated deck, a catenary-shaped testing sample, a fixed clamp on one end of the testing sample and a rotatable clamp on the other end of the testing sample, and a plurality of hydraulic cylinders for controlling the vertical and horizontal positions and motions of the elevated deck and the positions and rotations of the rotatable clamp, for analyzing the characteristics of the testing sample, such as its touchdown point dynamic motions and stresses.

11 Claims, 3 Drawing Sheets

CATENARY RISER TESTING

CROSS REFERENCE TO RELATED APPLICATIONS

This application claims the benefit of U.S. Provisional App. No. 61/944,580, filed on Feb. 26, 2014, which is incorporated herein by reference.

FIELD OF PRESENT DISCLOSURE

This present disclosure relates to catenary riser testing.

BACKGROUND INFORMATION

During oil and gas underwater field development, more and more catenary risers are used. The dynamic behavior of the touchdown point of these catenary risers can be complicated. Software tools can be used to simulate and analyze the dynamic motions and stresses at the touchdown point, but different software tools may use different analysis approaches, and produce different results that may be contradictory or inconclusive. Apparatus and methods have been proposed for testing the dynamic motions and stresses at the touchdown point of catenary risers.

DETAILED DESCRIPTION

Figure 1:
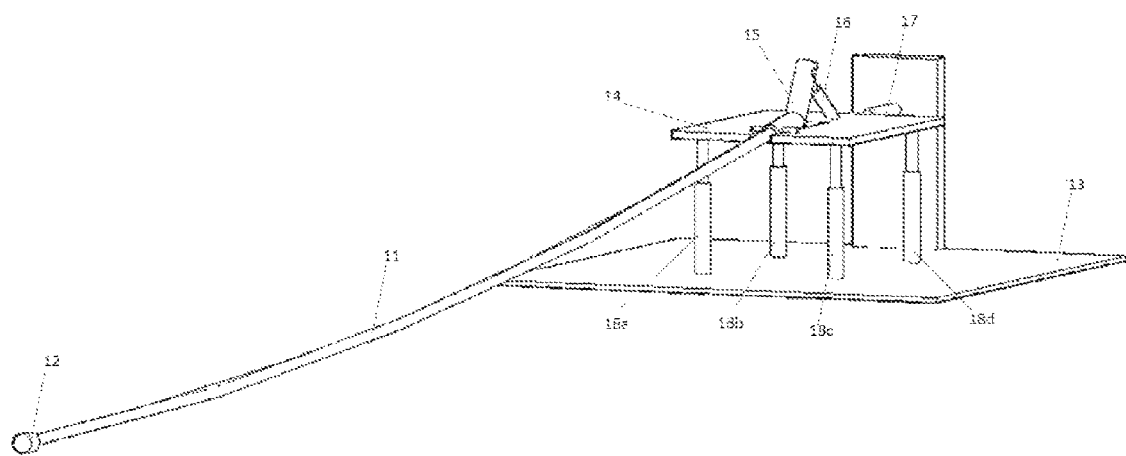
FIG. 1 is a diagram showing the overview of an embodiment of the apparatus and methods for testing catenary riser.

This document discloses apparatus and methods related to catenary riser testing. FIG. 1 shows an implementation of the apparatus and methods for catenary riser testing. The catenary riser testing for a testing sample 11 can be performed as follows. The testing sample 11 is fastened by two clamps on each end: one fixed clamp 12 and the other rotatable clamp 15. The fixed clamp 12 can be mounted on the far end of the testing sample, in a horizontal position. The fixed clamp 12 can be in the same vertical plane as the testing sample 11, and can be fixed to the ground in six degrees of freedom. The rotatable clamp 15 can be elbow-shaped, as depicted in FIG. 1, and attached to the near end of the testing sample 11. The rotatable clamp 15 can be connected to the elevated deck 14, and an inclined hydraulic cylinder 116, which is also connected to the elevated deck 14. The elevated deck 14 can be supported by a number of vertical hydraulic cylinder(s) 18 (18a, 18b, 18c, and 118d, as depicted in FIG. 1) stood on the ground platform 13, which contains a vertical portion, to which a number of horizontal hydraulic cylinder(s) 17 can be attached. The horizontal and vertical positions of the elevated deck 14 can be controlled by the horizontal hydraulic cylinder(s) 17 and vertical hydraulic cylinder(s) 18, respectively. The inclined angle of the rotatable clamp 15 can be controlled by the inclined hydraulic cylinder 16.

Figure 2:
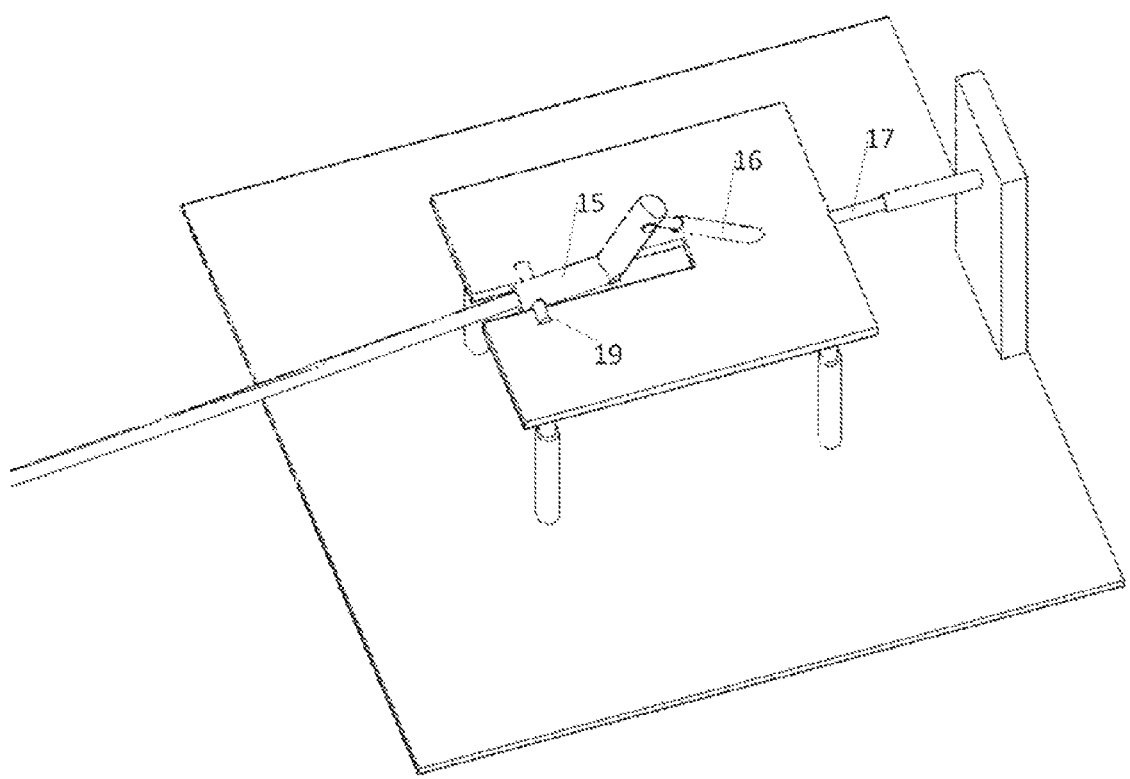
FIG. 2 is a diagram showing the top view of an embodiment of the apparatus and methods for testing catenary riser.

FIG. 2 shows the top view of an implementation of the apparatus and methods for catenary riser testing. A pivot pin 19 is used to connect the rotatable clamp 15 to the elevated deck 14, the horizontal position of which is controlled by a horizontal hydraulic cylinder 17.

Figure 3:
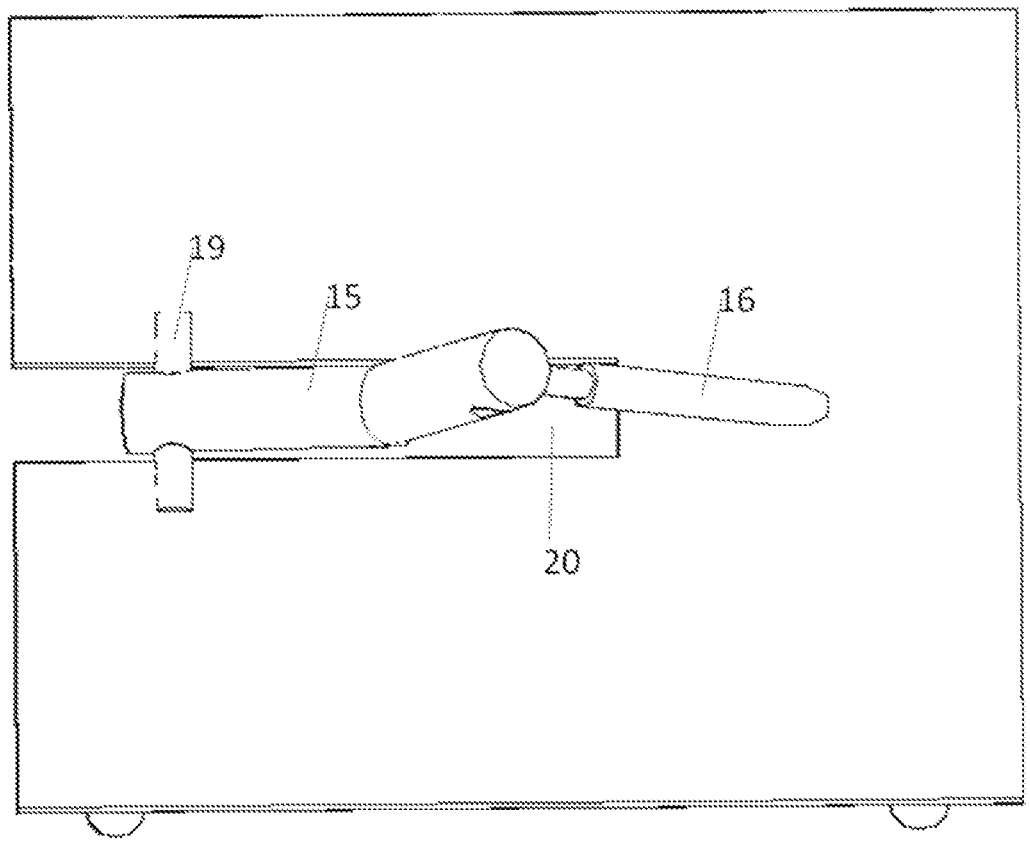
FIG. 3 is a diagram showing the zoomed-in top view of an embodiment of the apparatus and methods for testing catenary riser, where the rotatable clamp is connected to the elevated deck through a pivot pin and to the inclined cylinder that is connected to the elevated deck.

FIG. 3 shows the zoomed-in top view of an implementation of the apparatus and methods for catenary riser testing. The elevated deck 14 has an opening 20, through which the rotatable clamp 15 is connected to the elevated deck 14 via a pivot pin 19 and to the inclined cylinder 16 that is connected to the elevated deck 14. The rotatable clamp 15 can rotate about the pivot pin 19, and the inclined hydraulic cylinder 16 can be used to control the rotation thereof.

In some implementations, the testing sample 11 can be about twenty to forty meters in length. The elevated deck 14 can be raised above the ground platform 13 for about four meters.

In some implementations, the entire apparatus for catenary riser testing can be contained in a space of about fifty meters in length, ten meters in width, and live meters in height. The major parts of the apparatus, as shown at the elevated end of the testing sample, can occupy a space of about ten meters in length, ten meters in width, and five meters in height.

In some implementations, the catenary riser testing can be conducted as follows: (i) a desired motion of a testing sample can be created by a certain combination of the positions and motions of the vertical, horizontal, and inclined hydraulic cylinders; and (ii) record the motion and stress response at the touchdown point using any of a variety of methods known in the field. For example, a series of accelerometers can be attached along the testing sample to measure and record the time histories of the catenary riser acceleration at the attached positions, or a series of strain gauges can be attached along the testing sample to measure and record strain time histories at the attached positions.

In some implementations, the apparatus for catenary testing can be used to test any catenary shape near the touchdown point, including, for example, steel catenary risers, flexible, cables, or mooring lines, etc.

OTHER EMBODIMENTS

Various other adaptations and combinations of features of the embodiments and implementations disclosed are within the scope of the present disclosure. For example, the hydraulic cylinders in the present disclosure can be replaced by any of the tensioning devices that can extend and retract in a controllable way. It is to be understood that white the invention has been described in conjunction with the detailed description thereof the foregoing description is intended to illustrate and not limit the scope of the invention, which is defined by the scope of the appended claims. Other aspects, advantages, and modifications are within the scope of the following claims.

What is claimed is:

1. An apparatus to test a catenary shape of a testing sample in response to a motion, comprising:
   a ground platform;
   an elevated deck above the ground platform;
   a plurality of actuators coupling the elevated deck and the ground platform, wherein the plurality of actuators creates at least art of the motion;
   a rotatable clamp to receive and fasten onto a first end of the testing sample, wherein the rotatable clamp is rotatably connected to the elevated deck; and
   a fixed clamp to receive and fasten onto a second end of the testing sample, wherein:
   the fixed clamp is fixed relative to the around platform; and the fixed clamp is located lower than and away from the rotatable clamp so the testing sample assumes the catenary shape under its own weight when supported at the first and the second ends by the rotatable clamp and the fixed clamp.

2. An apparatus according to claim 1, wherein the plurality of actuators comprises vertical hydraulic cylinders that support the elevated deck above the ground platform.

3. An apparatus according to claim 2, wherein the plurality of actuators further comprises a horizontal hydraulic cylinder that connects the elevated deck and a vertical portion of the ground platform.

4. An apparatus according to claim 3, further comprising an inclined hydraulic cylinder that connects the rotatable clamp and the elevated deck, wherein the vertical, the horizontal, and the inclined hydraulic cylinders create the motion.

5. An apparatus according to claim 4, wherein the rotatable clamp comprises an elbow shape.

6. An apparatus according to claim 1, wherein the rotatable clamp is connected to the elevated deck through a pivot pin.

7. An apparatus according to claim 1, further comprising an actuator that connects the rotatable clamp and the elevated deck, wherein the plurality of actuator and the actuator create the motion.

8. An apparatus according to claim 1, wherein the fixed clamp is fixed to the ground.

9. An apparatus according to claim 1, wherein the rotatable clamp is connected to the inclined cylinder through a pivot pin.

10. An apparatus according to claim 1, wherein the fixed clamp is located about 4 meters lower than the rotatable clamp and about 20 to 40 meters away from the rotatable clamp.

11. A method for catenary riser testing, comprising:
fastening one end of a testing sample to a fixed clamp, wherein the fixed clamp is fixed at a desired position;
fastening the other end of the testing sample to a rotatable clamp located higher than and away from the fixed clamp so the testing sample assumes a catenary shape under its own weight and supported at its ends, wherein the rotatable clamp is made rotatable via its attachment with an elevated deck at one end and an inclined actuator at the other end, wherein the inclined actuator is further connected to the elevated deck, which is supported by at least one vertical actuator on a ground platform and can be driven horizontally by at least one horizontal actuator on a vertical portion of the ground platform;
creating a desired motion of the testing sample by prescribing a combination of the positions and motions of the vertical, the horizontal, and the inclined actuators; and
recording motion and stress response of the testing sample in response to the desired motion.

* * * * *